(12) United States Patent
Fowler

(10) Patent No.: US 10,103,950 B2
(45) Date of Patent: Oct. 16, 2018

(54) HUB FILTERING

(71) Applicant: Martin Carl Fowler, Fort Collins, CO (US)

(72) Inventor: Martin Carl Fowler, Fort Collins, CO (US)

(73) Assignee: CA, Inc., New York, NY (US)

( * ) Notice: Subject to any disclaimer, the term of this patent is extended or adjusted under 35 U.S.C. 154(b) by 359 days.

(21) Appl. No.: 14/832,223

(22) Filed: Aug. 21, 2015

(65) Prior Publication Data

US 2016/0294648 A1    Oct. 6, 2016

Related U.S. Application Data

(63) Continuation-in-part of application No. 14/673,070, filed on Mar. 30, 2015.

(51) Int. Cl.
*G06F 15/177*    (2006.01)
*H04L 12/26*    (2006.01)

(52) U.S. Cl.
CPC ............ *H04L 43/028* (2013.01); *H04L 43/08* (2013.01); *H04L 43/12* (2013.01)

(58) Field of Classification Search
USPC ........ 709/220, 226; 398/65; 370/252; 713/1; 718/104
See application file for complete search history.

(56) References Cited

U.S. PATENT DOCUMENTS

| | | | |
|---|---|---|---|
| 2011/0060895 A1* | 3/2011 | Solomon | G06F 8/36 713/1 |
| 2013/0055280 A1* | 2/2013 | Kruglick | G06F 9/5027 718/104 |
| 2013/0216228 A1* | 8/2013 | Nazarathy | H04B 10/272 398/65 |
| 2015/0341812 A1* | 11/2015 | Dion | H04W 24/08 370/252 |
| 2016/0294648 A1* | 10/2016 | Fowler | H04L 43/028 |
| 2016/0330286 A1* | 11/2016 | Keith | H04L 67/28 |

* cited by examiner

*Primary Examiner* — Tammy Nguyen
(74) *Attorney, Agent, or Firm* — Baker Botts L.L.P.

(57) ABSTRACT

Systems and methods may include deploying a probe within a unified infrastructure management ("UIM") system. The systems and methods may include discovering, via the probe, hubs within the UIM system. Each hub may pass UIM traffic. The systems and methods may include establishing, for each hub, a queue on the hub. The queue may log quality of service ("QoS") messages that pass through the hub. The systems and methods may include filtering, by the probe, each QoS message. The filtering of each QoS message may be filtering by a filter criteria. The filter criteria may specify an originating system at which the QoS message was originated. Additionally or alternatively, the filter criteria may specify a characteristic of a generating probe that generated the QoS message. The systems and methods may include providing information regarding each of the filtered QoS messages to a monitoring server.

20 Claims, 5 Drawing Sheets

| HUB SYSTEM | CPU | MEMORY AVAIL. | PROCESSES | IO | SYSLOG ERRORS | UPTIME |
|---|---|---|---|---|---|---|
| HUB01 SYSTEM | 65% | 2284MB | 428 | 4873 | 12 | 259200 |
| HUB02 SYSTEM | 48% | 1663MB | 215 | 3374 | 1 | 772980 |
| ... | | | | | | |

*FIG. 4A*

| PROBE | CPU | MEMORY | THREADS | SOCKETS | ERRORS | UPTIME |
|---|---|---|---|---|---|---|
| ALARM SERVER | 35% | 4274MB | 327 | 121 | 0 | 259200 |
| HUB | 28% | 3882MB | 228 | 150 | 32 | 77298 |
| CONTROLLER | 15% | 38MB | 50 | 25 | 5 | 892314 |
| ... | | | | | | |

*FIG. 4B*

HUB FILTERING

CROSS-REFERENCE TO RELATED APPLICATION

This application is a continuation-in-part of U.S. patent application Ser. No. 14/673,070, filed Mar. 30, 2015, the disclosure of which is incorporated herein by reference.

BACKGROUND

The present disclosure relates to monitoring and data collection and, more specifically, to systems and methods for hub filtering.

A probe is a program that may be installed on a robot for the purpose of monitoring or collecting data about network activity, system and application performance, and availability.

A robot is a program that may run on a system and control probe operation, manage probe communication, and pass data and alarms from probes to a hub.

The hub may be the backbone of a unified infrastructure management (UIM) system, which may bind together robots and hubs into a logical structure. Time structure may be based on physical network layout, location or organizational structure, but there are generally no restrictions in how the infrastructure is organized. In addition to managing the infrastructure, the hub may also be responsible for: message distribution, name services, tunnel services, security, authentication and authorization. In addition, a hub may include one or more queues therein.

A queue is a holding area for messages passing through a hub. The queues may be temporary or they may be defined as permanent queues. The permanent queues will survive a hub restart and is meant for service probes that need to pick up all messages regardless of whether the service probe is running or not. The temporary queue, on the other hand, is cleared during restarts.

BRIEF SUMMARY

According to an aspect of the present disclosure, a method may include several processes. In particular, the method may include deploying a probe within a unified infrastructure management ("UIM") system. In addition, the method may include discovering, via the probe, hubs within the UIM system. Each hub may pass UIM traffic. The method also may include establishing, for each hub, a permanent or temporary queue on the hub. The queue may log quality of service ("QoS") messages that pass through the hub. Further, the method may include filtering, by the probe, each QoS message. The filtering of each QoS message may be filtering by a filter criteria. The filter criteria may specify an originating system at which the QoS message was originated. Additionally or alternatively, the filter criteria may specify a characteristic of a generating probe that generated the QoS message. Moreover, the method may include providing information regarding each of the filtered QoS messages to a monitoring server.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

FIG. 4A illustrates an example of a table showing data about a system hosting a hub; and FIG. 4B illustrates an example of a table showing data about probes running on the hub.

DETAILED DESCRIPTION

Figure 1:
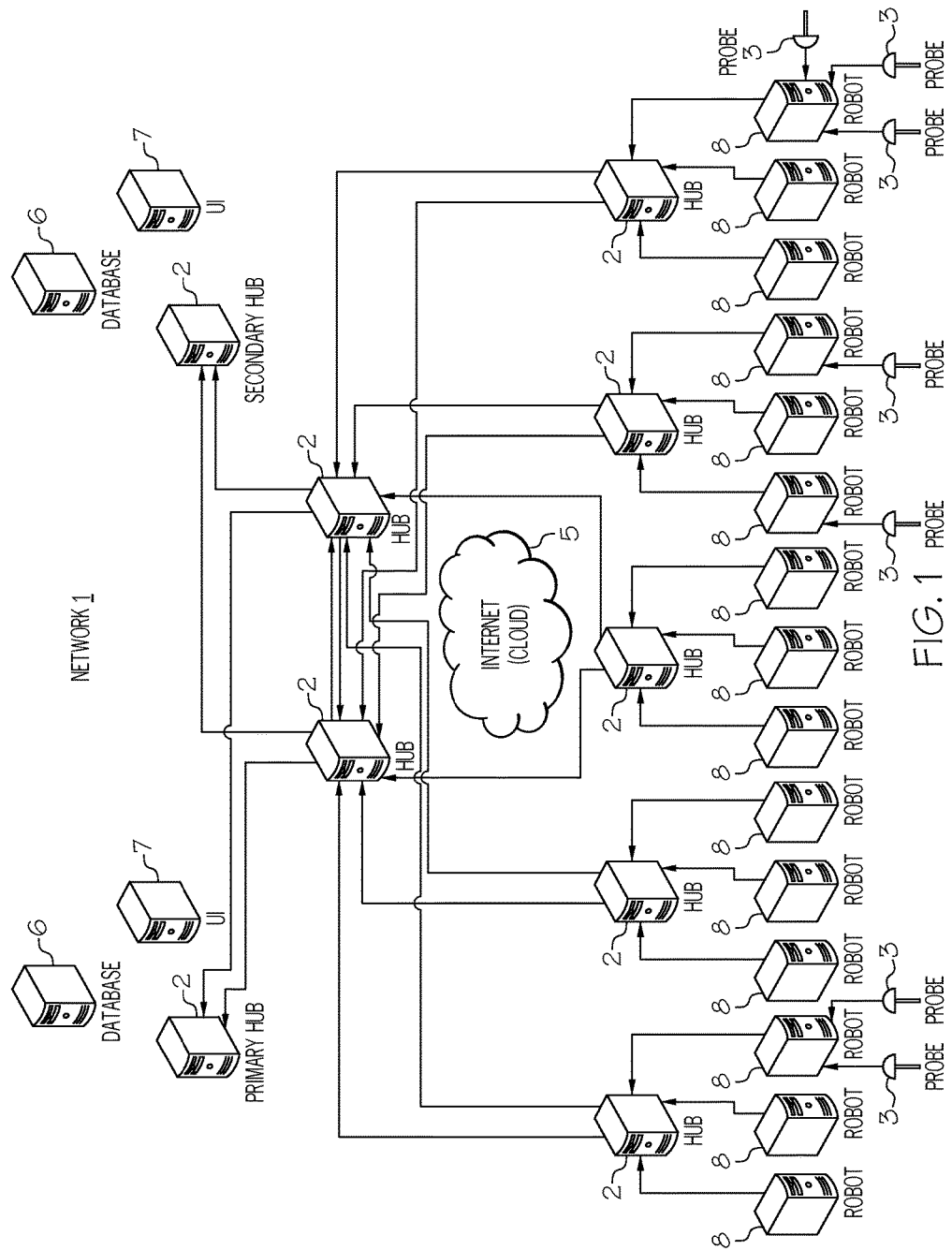
FIG. 1 is a schematic representation of a network including a plurality of devices, hubs, probes, and other components.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to information technology, systems and methods disclosed herein may be related to any field that may be associated with monitoring communication between devices and/or monitoring the status of devices. Systems and methods disclosed herein may be applicable to a broad range of applications that perform a broad range of processes.

Telecommunications networks transport a multitude of applications and data, including high-quality video and delay-sensitive data such as real-time voice. The bandwidth-intensive applications stretch network capabilities and resources, but also complement, add value, and enhance every business process. Networks must provide secure, predictable, measurable, and sometimes guaranteed services. Achieving the required Quality of Service ("QoS") by managing the delay, delay variation (jitter), bandwidth, and packet loss parameters on a network enables a successful end-to-end business solution. Thus, QoS is the set of techniques to manage network resources.

In the field of computer networking and other packet-switched telecommunication networks, traffic engineering may refer to resource reservation control mechanisms rather than the achieved service quality. QoS, however, may be the ability to provide different priority to different applications, users, or data flows, or to guarantee a certain level of performance to a data flow. For example, a required bit rate, delay, jitter, packet dropping probability and/or bit error rate may be guaranteed by a service provider. QoS guarantees may be important if the network capacity is insufficient, especially for real-time streaming multimedia applications such as voice over internet protocol ("IP"), online games and IP-TV, since these often require fixed bit rate and are delay sensitive, and in networks where the capacity is a limited resource.

QoS may be used as a quality measure, with many alternative definitions, rather than referring to the ability to reserve resources. QoS may refer to the level of quality of service (e.g., the guaranteed service quality), for example.

Existing UIM implementations collect and log messages by subject and do not permit filtering by the origin of such messages (e.g., the hub, system, and/or probe that generated the message). Consequently, when reviewing and analyzing information about messages within a UIM system, users may be presented with a substantial pipeline of data that includes the messages that have the desired subject from all components within the UIM system. Nevertheless, the user may only be interested in messages originating from particular components of interest (e.g., hubs, probes, servers, other systems) within the UIM system. Systems and methods disclosed herein may, for example, address this need by enabling a user to selectively filter messages based on the origin of such messages. More particularly, systems and methods disclosed herein may, for example, permit the user to filter QoS messages (e.g., the subject of such messages is information about one or more QoS metric) within the UIM system, such that the user may better-monitor the level of service being provided to/by particular components within the UIM system.

Monitoring the performance of components within a network infrastructure may be critical. QoS information about components within the system and other components with which such components interact may help system administrators better understand network performance and provide proactive and prophylactic support as needed. By enabling filtering of QoS messages based on origin, systems and methods disclosed herein may, for example, help system administrators better understand network performance at the component level and how subsets of network components interact with one another.

Certain systems and methods disclosed herein may allow for visualization of information relating to messages (e.g., QoS messages) originating from a subset of devices within a UIM system and may present such visualization in a dashboard that aggregates such information together. Particular information for each hub may be available within native interfaces through such hub, however, it may be difficult to obtain a holistic view of the status and performance of a particular group of hubs. For example, in a 200 hub deployment, the administrator would need to view the interface for every single hub, which is not an efficient (or even feasible) solution given the demands placed on a network administrator and the need to understand the network in a comprehensive manner at all times. The lack of a holistic solution is a challenge for network administrators, as problems with remote hubs may interrupt the flow of time-critical data to the central server.

Referring now to FIG. 1, a network 1 including a plurality of hubs 2, probes 3, databases 6, user interfaces 7, robots 8, and other components now is described. Network 1 may connect with and/or include clouds 5 and/or a plurality of network devices (not shown). Clouds 5 may be public clouds, private clouds, or community clouds, for example. Also, network 1 may include one or more of a LAN, a WAN, or another type of network. Moreover, network 1 may include and/or be connected to the Internet. Components within network 1 may be connected wirelessly in addition to or in lieu of wired connections, for example.

Each cloud 5 may permit the exchange of information and services among users that are connected to such clouds 5. In certain configurations, cloud 5 may be a wide area network, such as the Internet. In some configurations, cloud 5 may be a local area network, such as an intranet. Further, cloud 5 may be a closed, private network in certain configurations, and cloud 5 may be an open network in other configurations. Cloud 5 may facilitate wired or wireless communications of information among users that are connected to cloud 5.

Network 1 may include a plurality of network devices, which may be, for example, one or more of general purpose computing devices, specialized computing devices, mobile devices, wired devices, wireless devices, passive devices, routers, switches, mainframe devices, monitoring devices, infrastructure devices, desktop computers, laptop computers, tablets, phones, wearable accessories, and other devices. Such network devices may communicate by transmitting data packets that include one or more messages, which are processed by a UIM system.

As noted above, network 1 may include a plurality of hubs 2. Hubs 2 may be virtual devices implemented through software running on dedicated hardware, for example. In particular, hubs 2 may function as connection points between components associated with network 1. Each hub 2 may receive data packets (e.g., UIM messages) from one or more robots 8 and/or one or more other hubs 2 and forward such data packets to one or more other robots 8 and/or one or more other hubs 2. Hubs 2 may be established by service functions, for example.

In certain configurations, a hub 2 may queue received messages in one or more queues within such hub 2 prior to sending. For example, hub 2 may have different queues for different types of messages, for messages received from different components or different hubs 2, and/or for messages to be sent to different components or hubs 2. For example, a hub 2 may have a queue for QoS messages, as will be described in more detail below.

Network 1 may further include a plurality of probes 3. In some configurations, probes 3 may be selectively deployed throughout network 1 as needed (e.g., when desired, when an anomaly occurs, when it is predicted that an anomaly will likely occur, when a particular event occurs). In other configurations, probes 3 may be permanently deployed within network 1. Probes 3 may be virtual devices implemented through software, for example. Probes 3 may be installed on a particular robot 8, for example Probes 3 may monitor data transmitted within network 1, may discover components within network 1 (e.g., hubs 2), and/or may interface with such components to access and retrieve data from such components (e.g., identifying information for such components, a total number of components in network 1, a total number of queues within a hub 2, identifying information for each queue within a hub 2, a total number of messages sent by a hub 2 since such hub 2 was most-recently activated, a total number of messages received by a hub 2 since such hub 2 was most-recently activated, a total number of messages queued in a hub 2, a total number of messages in a particular queue within a hub 2).

Network 1 may include one or more database 6 that may store and aggregate information corresponding to hubs 2 that was acquired by probe 3. Network 1 also may include a user interface (UI) 7 that may generate a user interface, such as a dashboard, that permits an administrator to efficiently access the information stored in one or more databases 6. In addition, as described above, network 1 may include a plurality of robots 8, which may send UIM messages to hubs 2, and which may receive UIM messages from hubs 2. Robots 8 may manage, probe, and send probe messages to their corresponding hubs 2.

Particular systems and methods disclosed herein may utilize CA UIM hubs, which may be software programs that run on processing systems for the purpose of passing CA UIM messages to a central CA UIM server. In such systems and methods, the probe may similarly be a software program that runs on a robot. Such a probe may be installed in the domain, and all hubs within the domain may be discovered by the probe, regardless of where they reside. Likewise, the robot may also be a software program that manages probes, and sends probe messages to its hub. It may be possible to monitor multiple domains, with one monitoring probe in each domain. Such processing systems may be dedicated devices optimized to execute the hub, probe, and robot software programs, for example. System 100, which is described in more detail below, may be an example of one such processing system.

Figure 2:
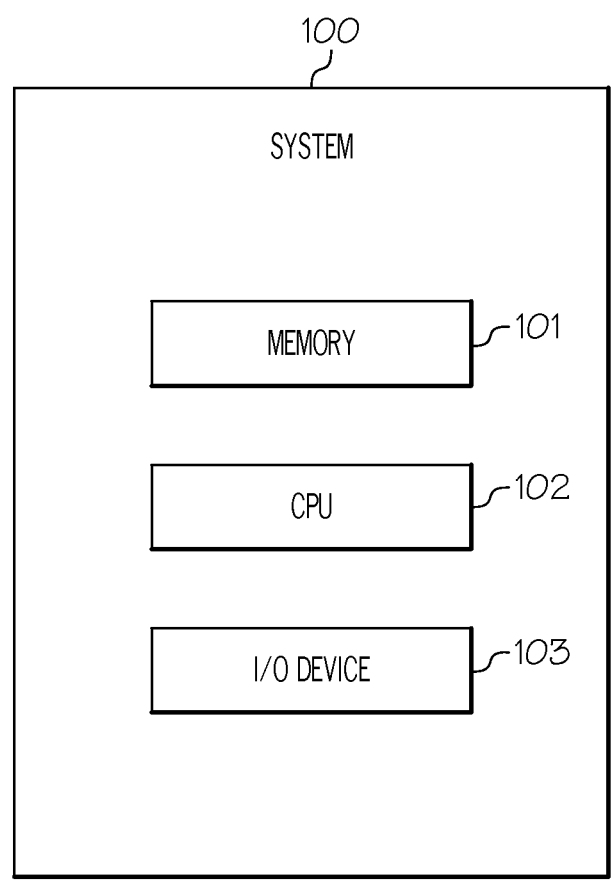
FIG. 2 is a schematic representation of a system configured to implement processes of hub filtering.

Referring to FIG. 2, system 100 is now described. System 100 may reside on one or more networks 1. System 100 may comprise a memory 101, a central processing unit ("CPU") 102, and an input and output ("I/O") device 103. Memory 101 may store computer-readable instructions that may instruct system 100 to perform certain processes. In particular, memory 101 may store computer-readable instructions for performing and/or controlling a hub filtering process. When such computer-readable instructions are executed by CPU 102, the computer-readable instructions stored in memory 101 may instruct CPU 102 to perform a plurality of functions. Examples of such functions are described below with respect to FIG. 3, for example. System 100 may be used to implement one or more of hubs 2, probe 3, databases 6, UIs 7, and robots 8, as well as other components within network 1.

I/O device 103 may receive one or more of data from networks 1, data from other devices, probes, and sensors connected to system 100, and input from a user and provide such information to CPU 102. I/O device 103 may transmit data to networks 1, may transmit data to other devices connected to system 100, and may transmit information to a user (e.g., display the information, send an e-mail, make a sound). Further, I/O device 103 may implement one or more of wireless and wired communication between system 100 and other devices in network 1 and/or cloud 5.

Figure 3:
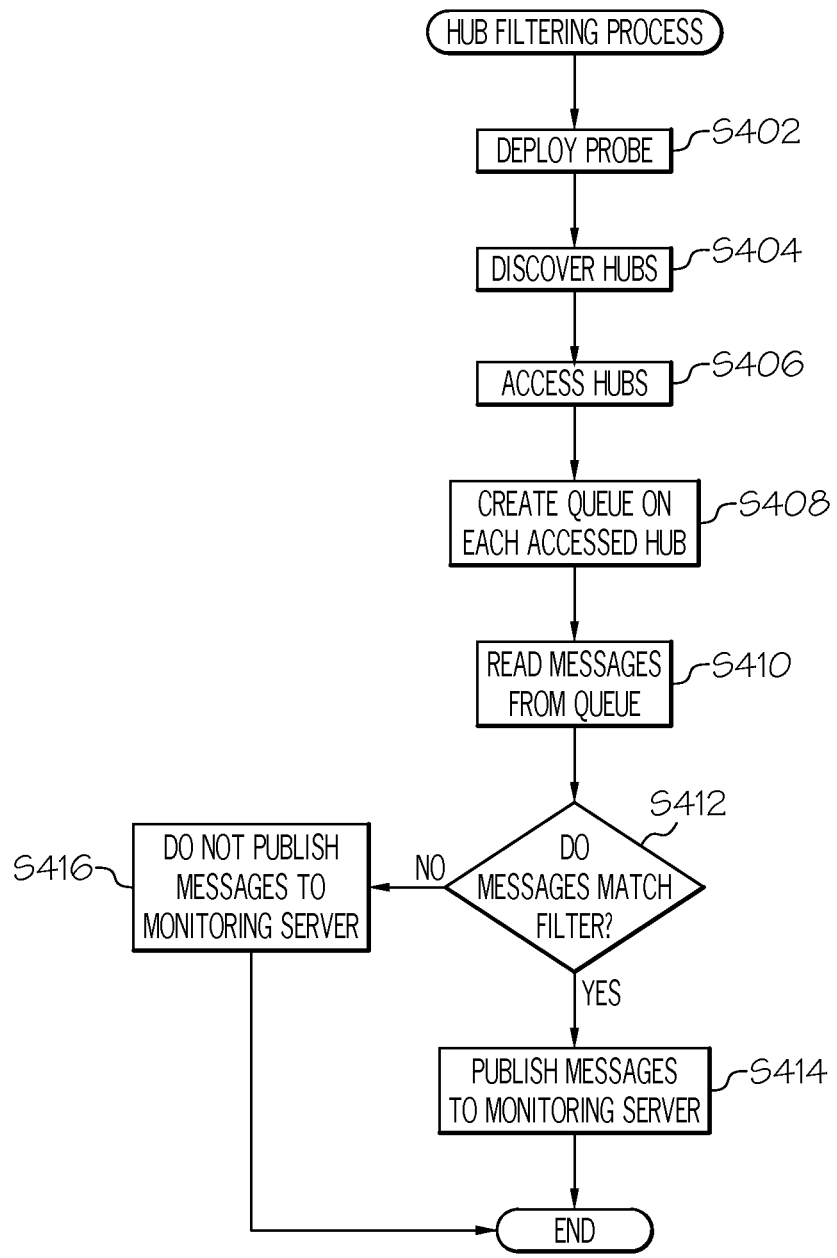
FIG. 3 illustrates a hub filtering process.

Referring to FIG. 3, a hub filtering process now is described.

In S402, system 100 may deploy one or more probes 3 within network 1. In certain implementations, system 100 may deploy such probe(s) 3 in response to a trigger event, for example, such as the occurrence of a specified condition or event, a monitored value nearing or reaching a threshold level, or information about anomalous activity within network 1. In other implementations, system 100 may deploy such probe(s) 3 on a periodic schedule, at predetermined intervals, or permanently when system 100 is activated.

In S404, system 100 may use the deployed probe(s) 3 to discover one or more hubs 2 within network 1. In certain implementations, the deployed probe(s) 3 may discover each active hub 2 within network 1 and determine the total number of active hubs 2 within network 1. For example, system 100 may control such probe(s) 3 to make various requests within network 1 and determine the presence of one or more hubs 2 when such hub(s) 2 respond(s) to such requests.

In S406, system 100 may control one or more of the deployed probes 3 to access the interface of one or more of the discovered hubs 2. In particular, probe(s) 3 may interface with each hub 2 and begin communicating with such hubs 2.

In S408, system 100 may establish a queue on each hub 2 accessed in S406. The queue may hold messages (or copies thereof) that pass through the hub 2. Such messages may be QoS messages, for example. Each queue may hold all messages (or copies thereof) that pass through the respective hub 2 or a portion of such messages (or copies), such as specified types of messages, messages received from specified components or hubs 2, and/or messages to be sent to specified components or hubs 2, for example.

In S410, system 100 may read the messages from each queue. For example, system 100 may determine the content of each such message. Such content, may include destination information, origination information, commands, statements, and/or other data, for example.

In S412, system 100 may determine, for each queue, whether the messages in the queue satisfy a specified filter criteria. For example, system 100 may determine whether the messages match the filter criteria. If the messages satisfy the filter criteria (S412: YES), the process may proceed to S414. If the messages do not satisfy the filter criteria (S412: NO), the process may proceed to S416.

In S414, system 100 may publish the messages that satisfy the filter criteria to a monitoring component for further analysis and inspection. Monitoring component may present the messages in a structured format that may provide additional information about the messages. The monitoring component may be a monitoring server, for example. In some implementations, such a monitoring server may be a component of system 100. After S414 has completed, the hub filtering process may end or continue filtering by repeating one or more of S402-S416.

In particular implementations, the structured format may be a user interface that may present an aggregated list of filtered messages from a plurality of hubs 2, for example. The user interface may provide an option to select a particular filtered message from the aggregated list for further investigation. In response to receiving a selection of a particular filtered message from the aggregated list, the user interface may provide additional information about the particular filtered message, such as the hub 2 from which the message was retrieved, the queue associated with the message, the type of queue associated with the message, the type, function, and/or importance of the message, origination and/or destination addresses for the message, and the time at which the message was retrieved, for example. Some or all of this information about the messages presented in the interface may be collected by a hub/queue-monitoring probe, rather than a filtering probe, for example.

The user interface may permit an administrator to view the network 1 and the hubs 2 at a plurality of levels. For example, the user interface may present a network-level view of the network 1 that displays the total number of hubs 2 within the network 1, the total number of messages queued in the network 1, average incoming and outgoing message rates for the network 1, and/or total number of different queues within the network 1, as well as other information. The network-level view also may include a list of the hubs 2 in the network 1, including corresponding identifiers for each hub 2. This list also may include summary information about each hub 2. When an administrator or other user selects one of the hubs 2 in the network-level view, the user interface may present a hub-level view of the selected hub 2 that displays the total number of queues within the hub 2, the total number of messages queued in the hub 2, average incoming and outgoing message rates for the hub 2, as well as other information. The hub-level view also may include a list of the queues in the hub 2, including corresponding identifiers for each queue. When an administrator or other user selects one of the queues in the hub-level view, the user interface may present a queue-level view of the selected queue that displays the total number of messages queued in the queue, average incoming and outgoing message rates for the queue, as well as other information. Consequently, the user interface may permit the administrator to drill-down into the network 1 and learn about the network 1 at a plurality of levels.

The user interface may include a centralized dashboard that permits network administrators to easily access information about all hubs and all queues within a deployment and to drill down to obtain more specific information as needed. FIGS. 4A and 4B (described in more detail below) show example tables and charts that may be presented within the user interface.

In S416, system 100 may not publish the messages to the monitoring server because such messages did not satisfy the filter criteria. After S416 has completed, the hub filtering process may end or continue filtering by repeating one or more of S402-S416.

Particular implementations of a monitoring probe disclosed herein may use the UIM product API to discover all hubs in a network deployment and thereafter access each hub specified by a filter criteria on a configurable interval (e.g., default 60 second intervals) to gather the such hubs' metrics. The retrieved metrics may be published to a database, such as a Nimsoft/UIM database. A dashboard may be created in conjunction with such data aggregation, and the dashboard may present table views of hub data and table views of queue data, for example. The data presented in the table views may be sortable by any of the collected metrics or even based on filter criteria, such as origin, and the tables and/or dashboard may provide an interface including the ability to drill-down for time-series views for particular metrics, such as the chart for a particular queue, or for more-detailed information regarding particular messages, hubs, systems, probes, and other components. The dashboard may be part of a web-based user interface, for example.

FIG. 4A illustrates an example of a table showing data about a system hosting a hub 2. The table of FIG. 4A may be provided in the interface at a first level, and the interface may permit selection of one or more systems. FIG. 4B illustrates an example of a table showing data about probes 3 running on a selected hub 2. The table of FIG. 4B may be provided in the interface at a second level, which may be drilled down from the first level. The interface may further permit selection of one or more probes 3 for further drilling down. A table similar to the table shown in FIG. 4B may be generated for each selected hub 2.

Figure 5:
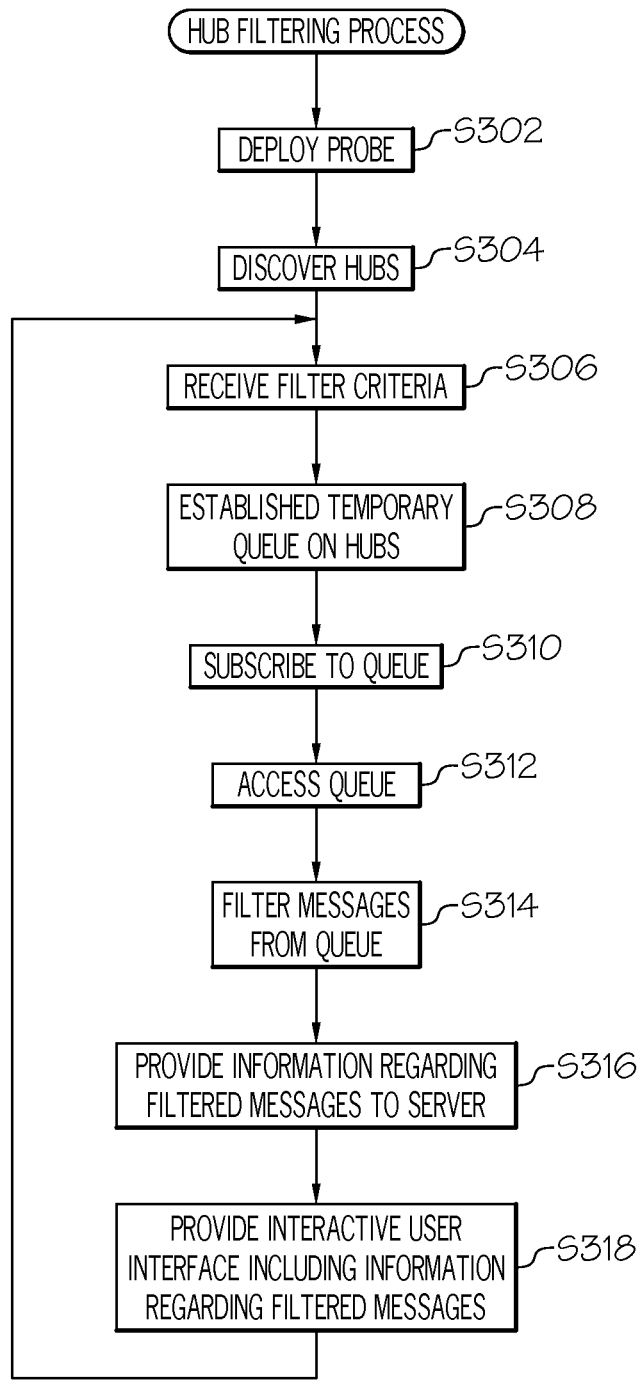
FIG. 5 illustrates another hub filtering process.

Referring now to FIG. 5, another hub filtering process now is described.

In S302, system 100 may deploy one or more probes 3 within network 1. In certain implementations, system 100 may deploy such probe(s) 3 in response to a trigger event, for example, such as the occurrence of a specified condition or event, a monitored value nearing or reaching a threshold level, or information about anomalous activity within network 1. In other implementations, system 100 may deploy such probe(s) 3 on a periodic schedule, at predetermined intervals, or permanently when system 100 is activated.

In S304, system 100 may use the deployed probe(s) 3 to discover one or more hubs 2 within network 1. In certain implementations, the deployed probe(s) 3 may discover each active hub 2 within network 1 and determine the total number of active hubs 2 within network 1. For example, system 100 may control such probe(s) 3 to make various requests within network 1 and determine the presence of one or more hubs 2 when such hub(s) 2 respond(s) to such requests.

In S306, system 100 may receive filter criteria. In certain implementations, such filter criteria may be received through a dashboard or other interface (e.g., such as the dashboard interface described below) based on a user selection or specification, for example. In some implementations, for example, the filter criteria may be set by default or predetermined. In particular implementations, the filter criteria may identify one or more originating systems for which monitoring (e.g., monitoring QoS activity) is desireable, for example. In some implementations, the filter criteria may identify one or more generating probes for which monitoring (e.g., monitoring QoS activity) is desireable. For example, the filter criteria may identify certain probes or systems explicitly by name, address, or other designation or may identify probes or systems based on characteristics, such as particular types of probes or systems, probes or systems operated at particular geographies, and/or probes or systems that perform particular functions or that have particular roles. In other words, the filter criteria may specify particular systems, probes, hubs, or other components of interest for which monitoring is desireable. In particular, it may be useful to monitor messages that originate from such systems, probes, hubs, or other components of interest. Alternatively or additionally, the filter criteria may identify one or more systems, probes, hubs, or other components of interest that are not necessarily the origin of monitored messages but rather are systems, probes, hubs, or other components through which such monitored messages transit.

In S308, system 100 may establish a queue on one or more hubs 2. The queue may be a queue for messages having a particular subject that originate in such hub 2, that pass through such hub 2, and/or that terminate in such hub 2. For example, the queue may be for QoS messages, such that all messages including QoS information that pass through the hub 2 are logged by the queue and identified as QoS messages. In some implementations, system 100 may establish a queue on each hub that satisfies the filter criteria (e.g., a hub identified by the filter criteria, a hub with a particular characteristic specified in the filter criteria, a hub associated with another component that satisfies the filter criteria). In this manner, a plurality of queues may be established, each such queue being established on a hub 2. Each queue may log (e.g., queue, generate information about) all messages having the particular subject (e.g., QoS) that pass through the respective hub 2 on which the queue is established. In alternative implementations, a queue for messages of the particular subject may be established on all hubs within the UIM system, rather than on only the hubs 2 of interest (e.g., specified by the filter criteria).

In S310, system 100 may subscribe a probe 3 to one or more queues established in S308. For example, in implementations in which a queue for QoS messages was established on each hub that satisfies the filter criteria, system 100 may subscribe probe 3 to each such queue. Alternatively, in implementations in which a queue for QoS messages was established on all hubs within the UIM system, system 100 may subscribe probe 3 to each queue that has been established on a hub 2 that satisfies the filter criteria. In both such implementations, the establishment of queues on hubs 2 that satisfy the filter criteria and the subscription to queues established on hubs 2 that satisfy the filter criteria each may be a respective filtering process that permits probe 3 access to a subset of QoS messages (e.g., those passing through hubs 2 that satisfy the filter criteria) transiting the UIM system, rather than all of the QoS messages transiting the UIM system.

In S312, system 100 may control probe 3 to access the interface of each of the hubs 2 to which probe 3 was subscribed in S310. In particular, probe 3 may interface with each subscribed hub 2 and begin communicating with such subscribed hubs 2. Thereafter, probe 3 may retrieve data from each subscribed hub 2. Such retrieval may take the form of a callback operation, for example.

In S314, system 100 may filter messages received from the plurality of queues. In the filtering process, system 100 may control probe 3 to identify QoS messages from each of the subscribed queues that satisfy the filter criteria. System 100 may control probe 3 to identify such QoS messages (e.g., QoS messages that satisfy the filter criteria) as filtered QoS messages and to collect information regarding such filtered QoS messages. For example, such filtering may include identifying each QoS message that was originated from a specified originating system as a filtered QoS message. As another example, such filtering may include identifying each QoS message that was generated by a specified generating probe as a filtered QoS message.

In certain implementations, the filtering performed in S314 may be in addition to the de facto filtering that occurs as a result of establishing queues for QoS messages on only the hubs 2 that satisfy the filter criteria in S308 and/or subscribing the probe 3 to only the queues for QoS messages established on hubs 2 that satisfy the filter criteria in S310. For example, probe 3 may identify hubs 2 of interest, from among the hubs 2 to which probe 3 is subscribed, based on the filter criteria and identify messages logged in the queue in each such hub as the filtered QoS messages. Probe 3 may even further filter such QoS messages based on additional requirements of the filter criteria. For example, the filter criteria may indicate that only recent messages e.g., messages younger than a specified age) satisfy the filter criteria. In this manner, probe 3 may identify only recent messages logged in the queues of the hubs 2 of interest as the filtered messages.

In some implementations (e.g., when queues for QoS messages are established on all hubs 2 in the UIM network and probe 3 is subscribed to all such QoS messages), the filtering performed in S314 may be the only filtering performed. In still other implementations (e.g., when de facto filtering is performed in S308 and/or S310), the filtering of S314 may be omitted for example.

In S316, system 100 may control probe 3 to provide the information regarding the filtered messages, which was acquired in S314, to a monitoring component, such as a monitoring server, for example. In some implementations, such a monitoring server may be a component of system 100. In some implementations, the information provided to the monitoring server may be a copy (or other instance) of each filtered QoS message, information describing each filtered QoS message (e.g., the time sent; the originating system, hub, queue, and/or probe; the QoS information from the message), and/or other useful information regarding each filtered QoS.

The monitoring server may store the received information in a database. The database may be a local component of system 100, a remote component, such as a server or other external storage medium, or some combination thereof. In certain implementations, the monitoring server may organize the received information based on a plurality of parameters, such as one or more of the hub 2 from which such information was retrieved, the queue associated with such information, the type of queue associated with such information, the type, function, and/or importance of message(s) and/or data packet(s) associated with such information, and the time at which such information was retrieved, for example.

In S318, system 100, the monitoring server (if distinct from system 100), and/or another device connected with the monitoring server may access the information regarding the filtered QoS messages at the monitoring server. System 100, the monitoring server, and/or the other device connected with the monitoring server may use the information regarding the filtered QoS messages to generate a user interface in which a user may access (e.g., view) information about the filtered QoS messages and learn about the performance of the components of the UIM system specified in the filter criteria. In some implementations, the user interface may provide the user with the option to specify the filter criteria and/or to perform a new/different hub filtering process.

While many of the above-described implementations involve queuing and filtering QoS messages, the disclosure is not so limited. Accordingly, systems and methods disclosed herein may readily filter messages having subjects/content other than QoS information.

A powerful aspect of systems and methods disclosed herein is that, by virtue of its collecting the information about all of the QoS messages specified by the filter criteria from one probe, the probe may be situated in the deployment domain such that the probe's published data may flow to another UIM server dedicated to monitoring the primary production UIM server (e.g., a monitoring server). Consequently, the probe may be used to efficiently monitor UIM systems.

The flowcharts and diagrams in FIGS. 1-5 illustrate the architecture, functionality and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   deploying a probe within a unified infrastructure management ("UIM") system;
   discovering, via the probe, a plurality of hubs within the UIM system, each hub passing UIM traffic;
   establishing, for each hub of the plurality of hubs, a queue on the hub, such that a plurality of queues are established for the plurality of hubs, wherein the queue logs quality of service ("QoS") messages that pass through the hub, such that a plurality of QoS messages are logged by the plurality of queues;
   filtering, by the probe, each QoS message of the plurality of QoS messages, such that a plurality of filtered QoS messages are identified, the filtering of each QoS message being filtering by a filter criteria specifying at least one of:
      an originating system at which the QoS message was originated; and
      a characteristic of a generating probe that generated the QoS message; and
   providing information regarding each of the plurality of filtered QoS messages to a monitoring server.

2. The method of claim 1, wherein the filtering of each QoS message comprises filtering by:
   the originating system at which the QoS message was originated, wherein the originating system is a hub of the plurality of hubs; and the characteristic of the generating probe that generated the QoS message, wherein the characteristic is an identifier for the generating probe within the UIM system.

3. The method of claim 1, wherein the filtering of each QoS message comprises identifying each QoS message that was originated from a specified originating system as one of the plurality of filtered QoS messages.

4. The method of claim 1, wherein the filtering of each QoS message comprises identifying each QoS message that was generated by a specified generating probe as one of the plurality of filtered QoS messages.

5. The method of claim 1,
wherein the queue logs the QoS messages that pass through the hub by queuing each of the QoS messages that pass through the hub in the queue, and
wherein providing information regarding each of the plurality of filtered QoS messages to the monitoring server comprises forwarding an instance of each of the plurality of filtered QoS messages to the monitoring server.

6. The method of claim 5, further comprising:
accessing the instance of each of the plurality of filtered QoS messages at the monitoring server; and
providing a user interface that includes an aggregated list of each of the plurality of filtered QoS messages.

7. The method of claim 6, wherein providing the user interface further comprises:
providing an option to select a particular filtered QoS message from the aggregated list; and
providing additional information about the particular filtered QoS message in response to receiving a selection of the particular filtered QoS message.

8. The method of claim 1, wherein establishing, for each hub of the plurality of hubs, the queue on the hub comprises:
identifying all messages that pass through the hub that include QoS information as the QoS messages; and
logging each of the QoS messages that pass through the hub.

9. The method of claim 1, further comprising:
receiving the filter criteria, wherein the filter criteria identifies a plurality of hubs of interest,
wherein establishing, for each hub of the plurality of hubs, the queue on the hub comprises:
establishing the queue on the hub in response to receiving the filter criteria that identifies the hub as one of the plurality of hubs of interest, and
wherein filtering each QoS message of the plurality of QoS messages comprises:
establishing a subscription for the probe to access the queue on each hub identified as one of the plurality of hubs of interest in the filter criteria;
accessing, by the probe, the queue established on each hub identified a one of the plurality of hubs of interest in the filter criteria; and
for each hub identified as one of the plurality of hubs of interest in the filter criteria, identifying a message that satisfies the filter criteria as a filtered QoS message of the plurality of filtered QoS messages.

10. The method of claim 9, wherein the originating system specified in the filter criteria is different from each of the hubs of the plurality of hubs of interest specified in the filter criteria.

11. A system comprising:
a processing system configured to:
deploy a probe within a unified infrastructure management ("UIM") system;
discover, via the probe, a plurality of hubs within the UIM system, each hub passing UIM traffic;
establish, for each hub of the plurality of hubs, a queue on the hub, such that a plurality of queues are established for the plurality of hubs, wherein the queue logs quality of service ("QoS") messages that pass through the hub, such that a plurality of QoS messages are logged by the plurality of queues;
filter, by the probe, each QoS message of the plurality of QoS messages, such that a plurality of filtered QoS messages are identified, the filtering of each QoS message being filtering by a filter criteria specifying
an originating system at which the QoS message was originated; and
provide information regarding each of the plurality of filtered QoS messages to a monitoring server.

12. The system of claim 11, wherein, when filtering each QoS message, the processing system is configured to filter each QoS message by:
the originating system at which the QoS message was originated, wherein the originating system is a hub of the plurality of hubs; and
the characteristic of the generating probe that generated the QoS message, wherein the characteristic is an identifier for the generating probe within the UIM system.

13. The system of claim 11, wherein, when filtering each QoS message, the processing system is configured to identify each QoS message that was originated from a specified originating system as one of the plurality of filtered QoS messages.

14. The system of claim 11, wherein, when filtering each QoS message, the processing system is configured to identify each QoS message that was generated by a specified generating probe as one of the plurality of filtered QoS messages.

15. The system of claim 11,
wherein the queue logs the QoS messages that pass through the hub by queuing each of the QoS messages that pass through the hub in the queue, and
wherein, when providing information regarding each of the plurality of filtered QoS messages to the monitoring server, the processing system is configured to forward an instance of each of the plurality of filtered QoS messages to the monitoring server.

16. The system of claim 15, wherein the processing system is further configured to:
access the instance of each of the plurality of filtered QoS messages at the monitoring server; and
provide a user interface that includes an aggregated list of each of the plurality of filtered QoS messages.

17. The system of claim 16, wherein, when providing the user interface, the processing system is further configured to:
provide an option to select a particular filtered QoS message from the aggregated list; and
provide additional information about the particular filtered QoS message in response to receiving a selection of the particular filtered QoS message.

18. The system of claim 11, wherein, when establishing, for each hub of the plurality of hubs, the queue on the hub, the processing system is configured to:
identify all messages that pass through the hub that include QoS information as the QoS messages; and
log each of the QoS messages that pass through the hub.

19. The system of claim 11, wherein the processing system is further configured to:
receive the filter criteria, wherein the filter criteria identifies a plurality of hubs of interest,
wherein, when establishing, for each hub of the plurality of hubs, the queue on the hub, the processing system is configured to:
establish the queue on the hub in response to receiving the filter criteria that identifies the hub as one of the plurality of hubs of interest, and
wherein, when filtering each QoS message of the plurality of QoS messages, the processing system is configured to:
establish a subscription for the probe to access the queue on each hub identified as one of the plurality of hubs of interest in the filter criteria;
access, by the probe, the queue established on each hub identified a one of the plurality of hubs of interest in the filter criteria; and
for each hub identified as one of the plurality of hubs of interest in the filter criteria, identify a message that satisfies the filter criteria as a filtered QoS message of the plurality of filtered QoS messages.

20. A computer program product comprising:
a non-transitory computer readable storage medium having computer readable program code embodied therewith, the computer readable program code comprising:

computer readable program code configured to deploy a probe within a unified infrastructure management ("UIM") system;

computer readable program code configured to discover, via the probe, a plurality of hubs within the UIM system, each hub passing UIM traffic;

computer readable program code configured to establish, for each hub of the plurality of hubs, a queue on the hub, such that a plurality of queues are established for the plurality of hubs, wherein the queue logs quality of service ("QoS") messages that pass through the hub, such that a plurality of QoS messages are logged by the plurality of queues;

computer readable program code configured to filter, by the probe, each QoS message of the plurality of QoS messages, such that a plurality of filtered QoS messages are identified, the filtering of each QoS message being filtering by a filter criteria specifying a characteristic of a generating probe that generated the QoS message; and computer readable program code configured to provide information regarding each of the plurality of filtered QoS messages to a monitoring server.

* * * * *